(No Model.)
2 Sheets—Sheet 1.

F. SANDERSON.
CLOTH MEASURING MACHINE.

No. 272,483. Patented Feb. 20, 1883.

Attest
S. Björnsen
F. A. Staley

Inventor
Frederick Sanderson
BY
H. Harrison
Attorney (No Model.)   2 Sheets—Sheet 2.

F. SANDERSON.
CLOTH MEASURING MACHINE.

No. 272,483. Patented Feb. 20, 1883.

Attest
I. Björnsen
F. A. Staley

Inventor
Frederick Sanderson
BY
H. Sullivan
Attorney

UNITED STATES PATENT OFFICE.

FREDERICK SANDERSON, OF FRIEND, NEBRASKA.

CLOTH-MEASURING MACHINE.

SPECIFICATION forming part of Letters Patent No. 272,483, dated February 20, 1883.

Application filed May 15, 1882. (No model.)

*To all whom it may concern:*

Be it known that I, FREDERICK SANDERSON, a citizen of the United States of America, residing at Friend, in the county of Saline and State of Nebraska, have invented certain new and useful Improvements in Rotary Measures for Dry-Goods, Carpets, &c., of which the following is a specification.

My invention relates to improvements in rotary measures for measuring dry-good, carpets, &c.

The object of my invention is to provide a simple, cheap, and portable device for measuring dry-goods, carpets, &c., in invoicing or otherwise; and my invention consists in certain details in construction and combination of parts, as hereinafter fully described with reference to the accompanying drawings, in which—

Figure 1:
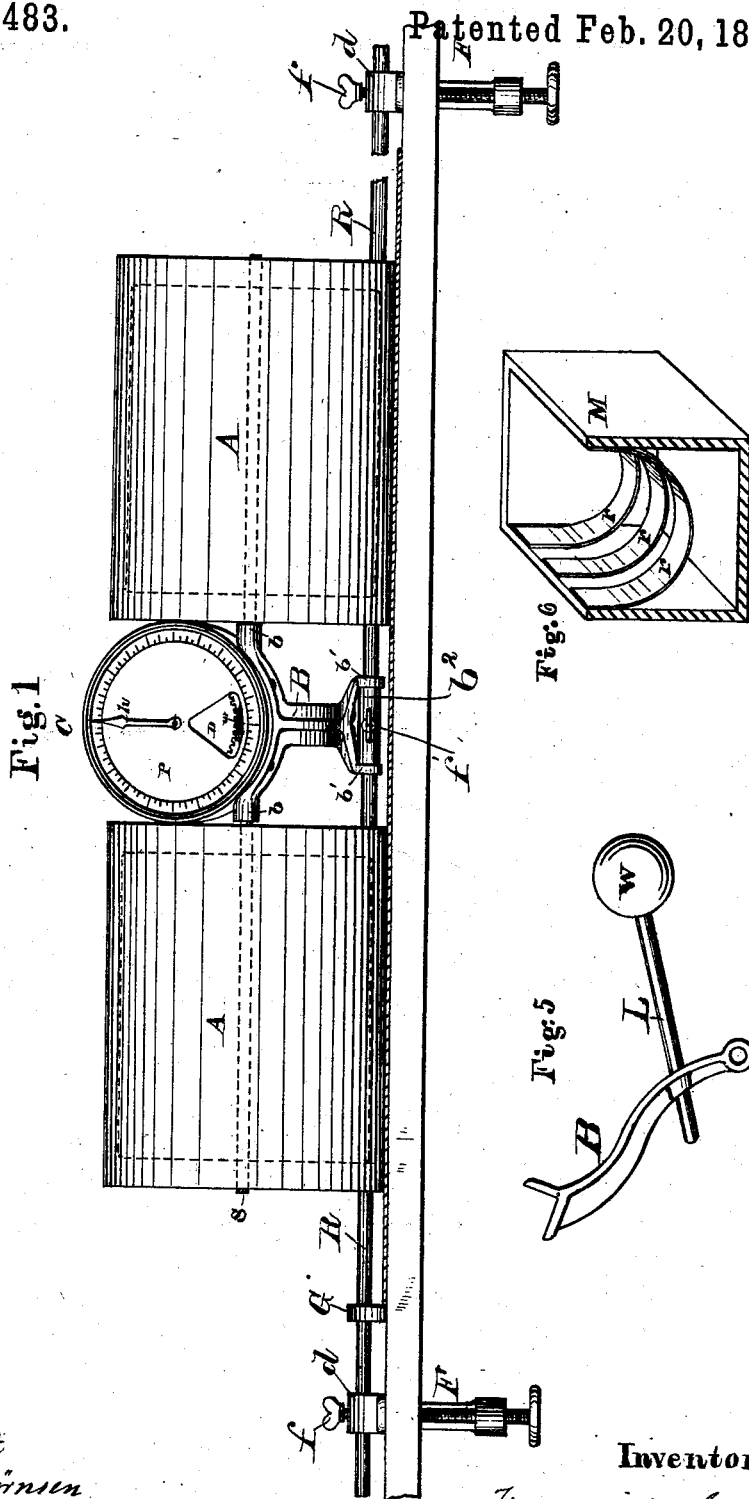
Figure 2:
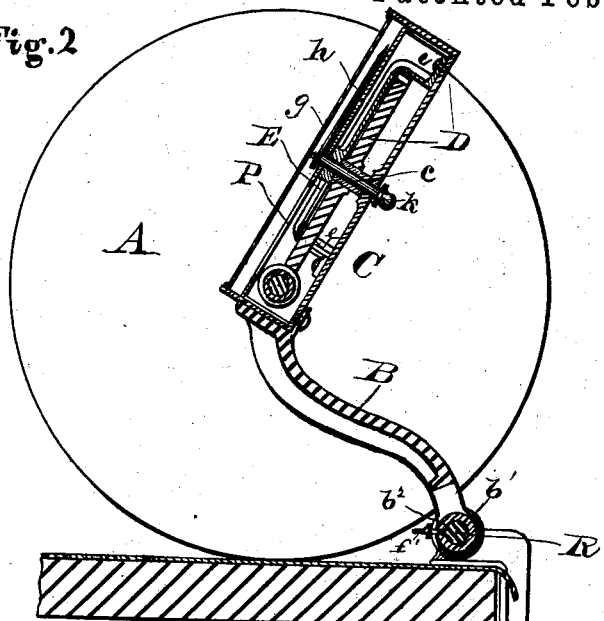
Figure 4:
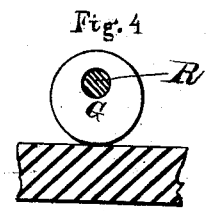
Figure 3:
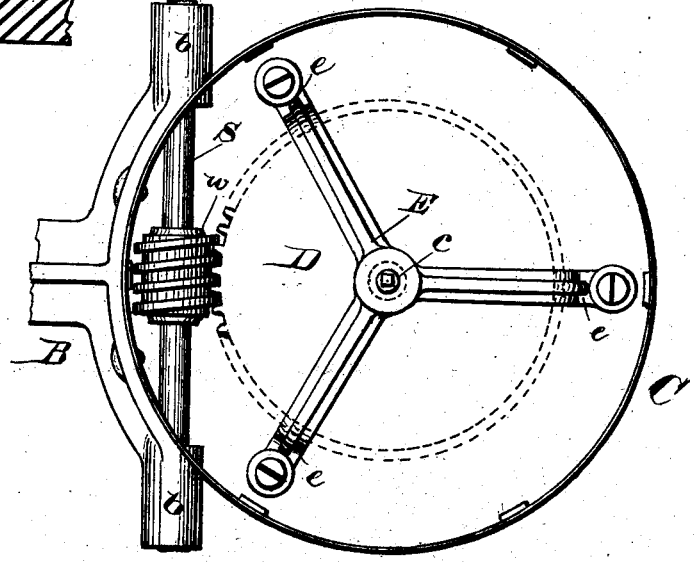

Figure 1 is a front elevation view of my improved device. Fig. 2 is a sectional elevation of the same. Fig. 3 is a plan view of the dial-case with the dial-plate removed. Figs. 4, 5, and 6 are detailed views, referred to hereinafter.

Similar letters of reference refer to similar parts throughout the several views.

In the said drawings, A A represent two rollers mounted on a shaft, S, which runs in bearings $b$ $b$ on the frame-piece B.

C is the dial-case, secured to the frame-piece B in such a manner that the part of the shaft S between the bearings $b$ $b$ passes through the said case, and is provided midway between said bearings with a worm, $w$, which meshes with a worm-wheel, D, mounted on a short shaft, $c$, which passes through the center of dial-case C, and has a bearing at the lower end in the back of said dial-case C, and at the upper end in a frame, E, supported on three legs, $e$ $e$ $e$, secured to the back of the case C and bent up over the worm-wheel D, as shown. Over the worm $w$ and worm-wheel D is a dial-plate, P, which fits in the dial-case C, graduated on its face, near the outer edge, and numbered to represent yards and fractions thereof. The short shaft $c$ extends through the dial-plate P, and is provided at its upper end with a hand or index-finger, $h$, the lower end projecting through the bottom of the case C, and having on the end thereof a knob, $k$. The dial-plate P and hand $h$ are covered by a glass, $g$. The worm-wheel D is not secured rigidly to the short shaft $c$, but fits sufficiently tight thereon so that the said shaft $c$ and hand $h$ are moved when the wheel is turned, but are free to be moved from the under side of the case C by the knob $k$ while the wheel D remains at rest.

The frame-piece B, which supports at its upper end the dial-case C and shaft S, as before described, is bifurcated at its lower end, and has two bearings, $b'$ $b'$, on a rod, R, which is supported at each end in the bearings $d$ in the top of the clamps F, clamped to the table or counter on which the device is to be placed, and provided with set-screws $f$, by means of which the rod R is held firmly in the bearings $d$ $d$, with the clamps F F at any desired distance apart.

$b^2$ is a collar, which fits snugly between the bearings $b'$ $b'$ on the rod R, and is held at any desired point thereon by a set-screw, $f'$. By this arrangement the device may be readily adapted to any width of goods, automatically adjusts itself to any thickness thereof, and may be readily taken apart when not in use.

G is a circular piece of any suitable material, which is slipped eccentrically on the rod R in such a manner that when turned as shown in Fig. 4 it binds tightly on the counter and serves as a guide for the goods being measured.

The rollers A A may be made of any suitable material, and are preferably made hollow to secure lightness. If desired, they may be faced with cloth or other suitable material to prevent slipping.

In measuring goods with this device the hand $h$ is turned around to the starting-point by means of the knob $k$ at the back of the dial-case. The goods are down under the rollers A A, the entire weight of the device resting thereon. As the goods are drawn through, the rollers A A are rotated, and through the agency of the worm $w$ and worm-wheel D move the hand $h$, registering the exact number of yards or fractions thereof in the piece of goods drawn through, the number of yards registered by one revolution of the hand $h$ around the dial-plate P being equal to the product of the circumference of the rollers A A and the number of teeth on the wheel D.

Fig. 5 shows a device for lessening the weight of the machine on the goods, and consists of a rod, L, having at one end a weight, W, the other end projecting through an opening in the frame B. By sliding the weight W to or from the frame B the weight of the machine on the goods may be varied at will.

In Fig. 6 an arrangement for holding the bolt of goods to be measured is shown; and it consists of a box, M, having strips $r$, of cloth or other suitable material, secured at each end to the sides of the box M, near the top, and hanging down in the center, as shown.

The bolt of goods to be measured is laid on the strips $r$, and turns smoothly thereon as the goods are unwrapped and measured by being drawn through the device.

By the use of this device a great saving of time and labor is accomplished, one man being able to do the work of several by the old method.

Having thus described my invention, what I claim as new, and desire to secure by Letters Patent, is—

1. In a rotary measuring device, a weighted lever, in combination with the frame of the device for lessening the weight of the machine on the goods, substantially as described and shown.

2. The combination, in a rotary measuring device, of a hinged frame, B, with a lever, L, and weight W, substantially as and for the purpose set forth.

3. The combination of rollers A A, shaft S, dial-case C, worm $w$, wheel D, plate P, index-hand $h$, frame-piece B, bearings $b\ b$ and $b'\ b'$, rod R, adjustable collar $b^2$, and clamps F F, substantially as shown and described.

4. In a rotary measuring device, the combination, with the rod R, of an eccentric guide, G, adapted to be turned down tightly upon the counter or other support, substantially as described.

In testimony whereof I affix my signature in presence of two witnesses.

FREDERICK SANDERSON.

Witnesses:
ALBERT ALLDRITT,
H. W. HEWIT.